(12) United States Patent
Huang et al.

(10) Patent No.: US 12,488,789 B2
(45) Date of Patent: Dec. 2, 2025

(54) METHOD AND DEVICE FOR EFFICIENT OPEN VOCABULARY KEYWORD SPOTTING

(71) Applicant: LG ELECTRONICS INC., Seoul (KR)

(72) Inventors: Jinmiao Huang, Toronto (CA); Waseem Gharbieh, Grimsby (CA); Qianhui Wan, Shanghai (CN)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 18/299,938

(22) Filed: Apr. 13, 2023

(65) Prior Publication Data

US 2023/0335118 A1    Oct. 19, 2023

Related U.S. Application Data

(60) Provisional application No. 63/330,312, filed on Apr. 13, 2022.

(51) Int. Cl.

| | |
|---|---|
| *G10L 15/16* | (2006.01) |
| *G10L 15/02* | (2006.01) |
| *G10L 15/06* | (2013.01) |
| *G10L 15/22* | (2006.01) |
| *G10L 15/08* | (2006.01) |

(52) U.S. Cl.
CPC .............. *G10L 15/16* (2013.01); *G10L 15/02* (2013.01); *G10L 15/063* (2013.01); *G10L 15/22* (2013.01); *G10L 2015/088* (2013.01)

(58) Field of Classification Search
CPC ... G10L 15/16; G10L 2015/088; G10L 15/22; G10L 15/063; G10L 2015/223; G10L 13/02; G10L 25/30; G10L 15/02; G10L 15/04; G10L 15/08; G10L 15/10; G10L 17/00
USPC ......................................................... 704/232
See application file for complete search history.

(56) References Cited

U.S. PATENT DOCUMENTS

| | | | |
|---|---|---|---|
| 11,587,569 B2* | 2/2023 | Ye | G10L 25/30 |
| 12,101,609 B1* | 9/2024 | Mazed | H04W 12/06 |
| 2019/0020530 A1* | 1/2019 | Au | H04W 72/21 |
| 2021/0304769 A1* | 9/2021 | Ye | G10L 15/26 |
| 2021/0383796 A1* | 12/2021 | Coucke | G10L 15/22 |
| 2022/0280072 A1* | 9/2022 | Timofejevs | G06F 18/24147 |
| 2022/0343895 A1* | 10/2022 | Tomar | G10L 15/16 |
| 2023/0081715 A1* | 3/2023 | Timofejevs | G06N 3/065 |
| | | | 706/21 |

(Continued)

*Primary Examiner* — Vijay B Chawan
(74) *Attorney, Agent, or Firm* — LEE, HONG, DEGERMAN, KANG & WAIMEY

(57) ABSTRACT

A computer-implemented method includes receiving enrollment audio from a user comprising a wake word to be enrolled for the device, preprocessing the enrollment audio to obtain a vector representation along at least a feature dimension and a temporal dimension, inputting the extracted vector representation to a trained encoding model to generate an embedding representation of the enrollment audio, wherein the encoding model includes a plurality of mixing blocks, and wherein the feature dimension and the temporal dimension of an output of a first layer of each mixing block are flipped for inputting to a second layer of the mixing block, and storing the generated embedding representation in a memory for use in detecting input of the enrolled wake word.

18 Claims, 9 Drawing Sheets

(56) References Cited

U.S. PATENT DOCUMENTS

| | | | |
|---|---|---|---|
| 2023/0104431 A1* | 4/2023 | Smyth | G10L 15/16 704/243 |
| 2023/0217195 A1* | 7/2023 | Poltorak | H04R 25/609 381/315 |
| 2023/0298592 A1* | 9/2023 | Yang | G10L 17/08 704/232 |
| 2023/0335118 A1* | 10/2023 | Huang | G10L 15/063 |

* cited by examiner

METHOD AND DEVICE FOR EFFICIENT OPEN VOCABULARY KEYWORD SPOTTING

CROSS-REFERENCE TO RELATED APPLICATION

Pursuant to 35 U.S.C. § 119(e), this application claims the benefit of U.S. Provisional Patent Application No. 63/330,312, filed on Apr. 13, 2022, the contents of which are hereby incorporated by reference herein in its entirety.

FIELD

The present disclosure generally relates to improvements in query by example open vocabulary keyword spotting for implementation at edge devices.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms construct a specific model in order to obtain the prediction or the determination based on the input data, rather than performing strictly defined static program instructions.

Voice recognition, also known as speech recognition or automatic speech recognition (ASR), is a field of machine learning that involves training a computer program to recognize and transcribe human speech. The goal of voice recognition is to enable machines to understand and interpret human speech as accurately as possible.

Keyword spotting is a technique used in voice recognition technology to identify specific words or phrases in spoken language. In keyword spotting, the voice recognition system implementing a machine learning model is trained to recognize and respond to specific keywords, such as a person's name or a particular command, without necessarily transcribing the entire spoken phrase.

When a user speaks a keyword, the voice recognition system detects the presence of that keyword and responds accordingly. This technique is commonly used in applications like virtual assistants, where users can initiate a command simply by saying a specific keyword, also referred to as a wake word, such as "Alexa," "Hey Siri," or "OK Google." Keyword spotting works by analyzing the audio signal for specific patterns or features that are characteristic of the target keyword. This can involve techniques such as filtering out background noise, segmenting the audio into smaller units, and analyzing the frequency and amplitude of the signal.

However, previous efforts in keyword spotting implemented at edge devices are limited by the edge device, which is often limited in resources such as computing power and memory. Thus, the traditional keyword spotting techniques rely on fixed wake words (such as "Alexa, "Hey Siri," or "OK Google") by deploying the edge devices with prestored and pretrained machine learning models which are limited to recognizing one or a few fixed wake words. These pretrained machine learning models are trained and stored prior to deployment without open-vocabulary capabilities, thus it is not possible for an end user to change the wake word of the edge device to a new custom word of the user's choosing.

Further, in the few existing approaches which do allow end users to enter or record audio of their own voice to change the edge device wake word, this requires the recording of the user to be transmitted to a more robust computing device, such as a server, where the machine learning model is retrained based on the recorded user entry, and the retrained model is transmitted back to the edge device for storage and deployment. Thus, the existing approaches, such as those discussed above, involve deficiencies which take away from the end user's experience and enjoyment, or involves low latency, additional memory, power, or bandwidth, or other resources thereby reducing the system's effectiveness.

SUMMARY

Accordingly, an object of the present disclosure is to address the above challenges using an open-vocabulary keyword spotting system with high accuracy and lower power consumption.

Embodiments of the present disclosure include solutions to the open vocabulary keyword spotting for implementation at edge devices. In particular, disclosed are embodiments of an MLPMixer based encoding model allowing for a small footprint user defined keyword spotting model, as well as a convolution based model inspired by the MLPMixer architecture.

An implementation of the present disclosure includes a computer-implemented method for open vocabulary keyword spotting by a device, the computer-implemented method comprising: receiving enrollment audio from a user comprising a wake word to be enrolled for the device; preprocessing the enrollment audio to obtain a vector representation along at least a feature dimension and a temporal dimension; inputting the extracted vector representation to a trained encoding model to generate an embedding representation of the enrollment audio, wherein the encoding model comprises a plurality of mixing blocks, and wherein the feature dimension and the temporal dimension of an output of a first layer of each mixing block are flipped for inputting to a second layer of the mixing block; and storing the generated embedding representation in a memory for use in detecting input of the enrolled wake word.

In some implementations, the first layer and the second layer of each mixing block are fully connected layers.

In some implementations, the first layer and the second layer of each mixing block are convolution layers.

In some implementations, the method may further include receiving input audio at the device; obtaining one or more portions of the input audio based on a preset duration of each portion; preprocessing the one or more portions to obtain one or more vector representations of the one or more portions along at least the feature dimension and the temporal dimension; inputting the extracted one or more vector representations of the one or more portions to the encoding model to generate one or more embedding representations of the input audio; determining whether the input audio comprises the enrolled wake word based on a comparison between the one or more embedding representations of the input audio and the stored embedding representation; and triggering the device based on the determination that the input audio comprises the enrolled wake word.

In some implementations, the determination is made based on a similarity between the stored embedding representation and the one or more embedding representations of the input audio meeting a preset similarity threshold.

In some implementations, the method may further include padding the stored embedding representation or the one or more embedding representations of the input audio to match lengths for the comparison.

In some implementations, the comparison comprises determining a cosine distance between the one or more embedding representations of the input audio and the stored embedding representation, and determining a minimum distance which is compared to a threshold for determining whether the input audio comprises the enrolled wake word.

In some implementations, the method may further include obtaining one or more portions of the enrollment audio each having a duration of 1 second, wherein the dimensions of the vector representation are 81 by 81, or n by m, where n and m are any non-zero integers, along the feature dimension and the temporal dimension, respectively.

Another implementation of the present disclosure includes an artificial intelligence (AI) device for open vocabulary keyword spotting, the AI device comprising: an audio input; a memory; and one or more processors configured to: receive, via the audio input, enrollment audio from a user comprising a wake word to be enrolled for the device; preprocess the enrollment audio to obtain a vector representation along at least a feature dimension and a temporal dimension; input the extracted vector representation to a trained encoding model to generate an embedding representation of the enrollment audio, wherein the encoding model comprises a plurality of mixing blocks, and wherein the feature dimension and the temporal dimension of an output of a first layer of each mixing block are flipped for inputting to a second layer of the mixing block; and storing the generated embedding representation in a memory for use in detecting input of the enrolled wake word.

Yet another implementation of the present disclosure includes a non-transitory memory storing one or more programs, which, when executed by the one or more processors of a computing device, cause the computing device to perform: receiving enrollment audio from a user comprising a wake word to be enrolled for the device; preprocessing the enrollment audio to obtain a vector representation along at least a feature dimension and a temporal dimension; inputting the extracted vector representation to a trained encoding model to generate an embedding representation of the enrollment audio, wherein the encoding model comprises a plurality of mixing blocks, and wherein the feature dimension and the temporal dimension of an output of a first layer of each mixing block are flipped for inputting to a second layer of the mixing block; and storing the generated embedding representation in a memory for use in detecting input of the enrolled wake word.

In accordance with some implementations, a computing or electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
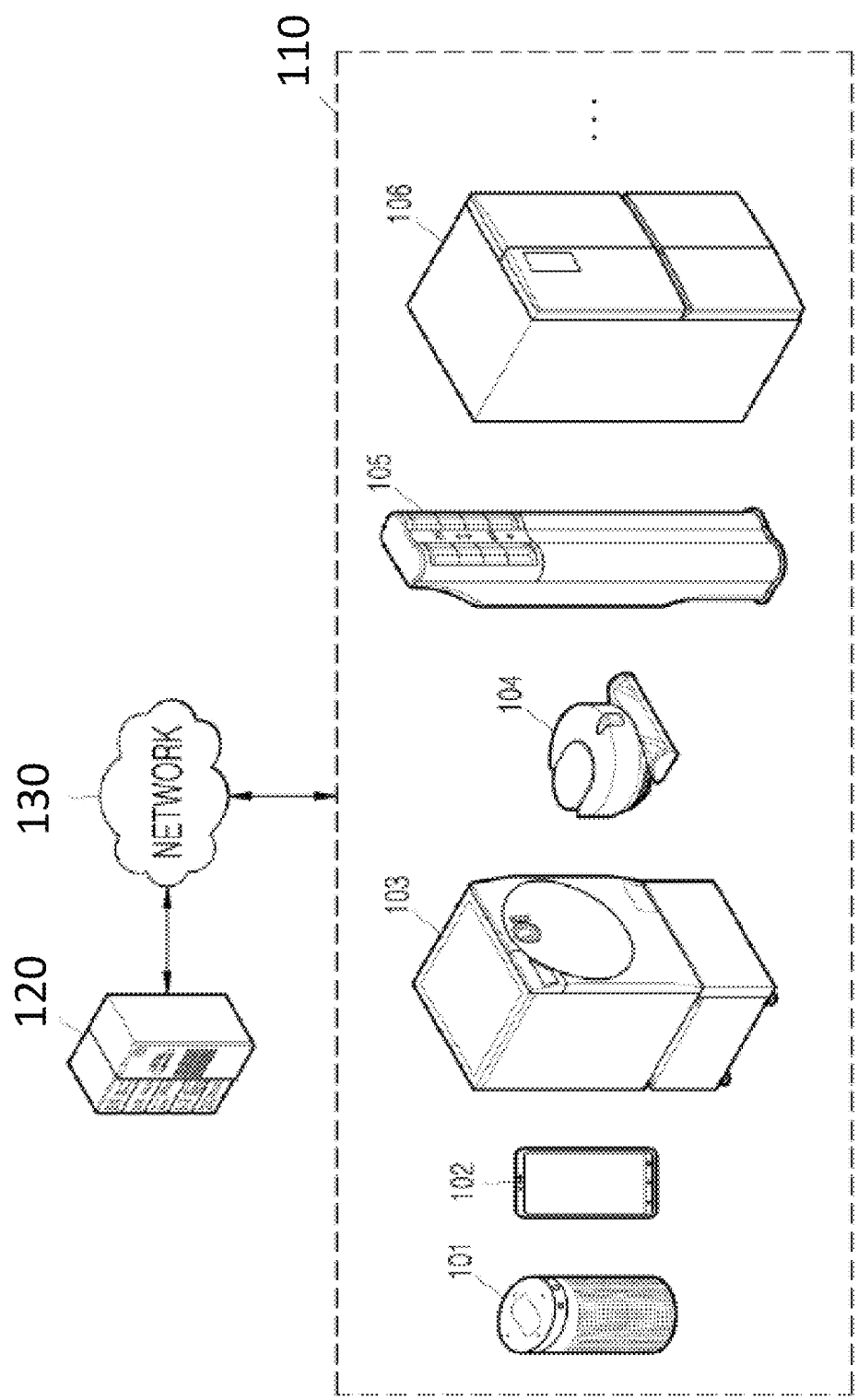
FIG. 1 is a view illustrating an example of an AI system comprising an AI device, an AI server, and a network connecting the above-mentioned components in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Hereinafter, the implementations disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used interchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the implementations presented herein are not limited by the accompanying drawings. As such, the present disclosure should be construed to extend to any alterations, equivalents, and substitutes in addition to those which are particularly set out in the accompanying drawings.

The terminology used herein is used for the purpose of describing particular example implementations only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, implementations of the present disclosure will be described in detail with reference to the accompanying drawings. Like reference numerals designate like elements throughout the specification, and overlapping descriptions of the elements will not be provided.

FIG. 1 is a view illustrating an example of an AI system including an AI device, an AI server, and a network connecting the above-mentioned components. While pertinent features are shown, those of ordinary skill in the art will appreciate from the present disclosure that various other features have not been illustrated for the sake of brevity and so as not to obscure more pertinent aspects of the example implementations disclosed herein.

Referring to FIG. 1, the AI device 100, also referred to herein as an edge device, may include an artificial intelligence based apparatus of the present disclosure deployed, installed, or otherwise implemented for use in an environment, which includes for example, at least one of a smart speaker 101, personal devices such as a tablet, laptop, or mobile phone 102, personal and home appliances such as a washing/drying machine 103, robot vacuum cleaner 104, air purifier 105, refrigerator 106, or the like. However, the disclosure is not limited to these examples, and one of ordinary skill in the art will consider that the embodiments of the present disclosure are applicable and may be implemented in various other types of AI devices or systems.

Here, artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning. Supervised learning may refer to a method for training an artificial neural network with training data that has been given a label. In addition, the label may refer to a target answer (or a result value) to be guessed by the artificial neural network when the training data is inputted to the artificial neural network.

As a result, the artificial intelligence apparatus 110 may train the artificial neural network using a machine learning algorithm using methods such as incremental learning or requests a trained artificial neural network from the AI server 120 to receive the trained artificial neural network from the AI server 120. Further, when new input is received at the AI device 110, the AI device 110 may identify a keyword in the received new input using the trained artificial neural network, in the case of an audio keyword spotting AI device.

When the AI server 120 receives a request for a trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a configuration of a portion of the AI device 110, and may thus perform at least a portion of the AI processing together. However, as discussed above, it may be advantageous using embodiments of the present disclosure for the AI device 110 to be able to receive new inputs and identify user-specific keywords using the model stored at the device, without requiring additional training by the AI server 120.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 130 may also send and receive information using short distance communication and/or long distance communication. The short-range communication may include Bluetooth®, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as a hub, a bridge, a router, a switch, and a gateway. The network 130 can include one or more connected networks, for example, a multi-network environment, including a public network such as an internet and a private network such as a safe corporate private network. Access to the network 130 may be provided through one or more wire-based or wireless access networks. Furthermore, the network 130 may support the Internet of Things (IoT) network for exchanging and processing information between distributed elements such as things, 3G, 4G, Long Term Evolution (LTE), 5G communications, or the like.

Figure 2:
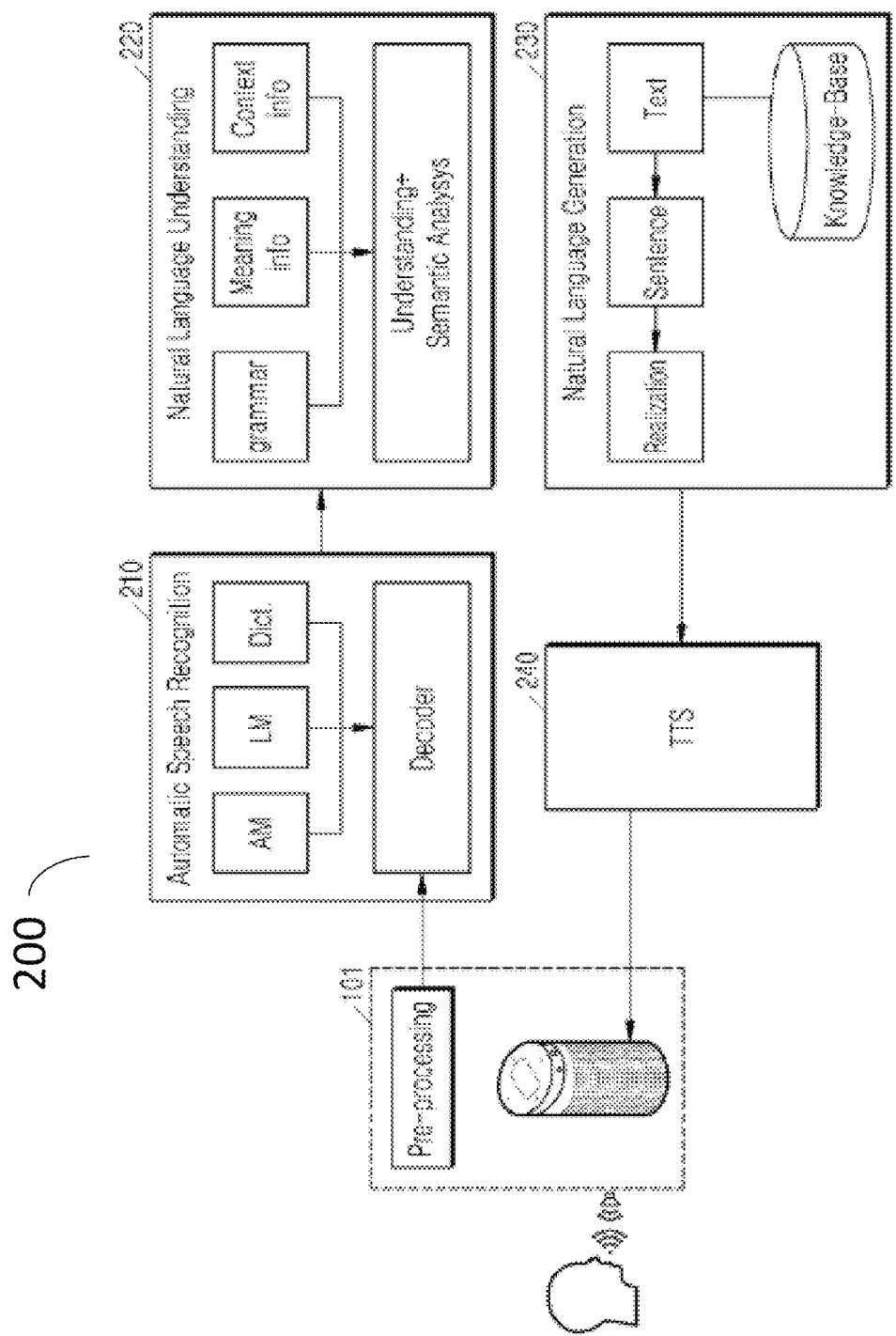
FIG. 2 is a view illustrating a speech processing system according to an exemplary embodiment of the present disclosure.

FIG. 2 is a block diagram depicting an example of a speech processing system according to an exemplary embodiment of the present disclosure. Referring to FIG. 2, a smart speaker 101 for performing pre-processing and the speech processing system 200 are illustrated, however implementations of various AI devices as discussed above are considered. The speech processing system 200 may be configured to include automatic speech recognition 210, natural language understanding 220, natural language generation 230, and text to speech 240.

As discussed, the speech processing system 200 and its elements may be implemented by various components of one or more smart speakers 101 or one or more AI servers 120, including various respective computing controllers, processors, memory, circuits, buses, transceivers, sensors, and the like, including those additional that are dedicated and/or configured to process AI tasks.

The speech recognition 210 recognizes speech data or the meaning of a speech feature vector, which is generated through pre-processing, by using an acoustic model, a language model, and various dictionaries, such as an acoustic dictionary. A decoder, namely, a speech recognition engine, may be used for speech recognition. The speech recognition engine may recognize speech by using various methods, such as probability theory and artificial intelligence.

The natural language understanding 220 understands and analyzes the meaning of recognized speech by using grammar, meaning information, and context information. The natural language generation 230 generates text by using a knowledge base on the basis of the analyzed meaning, and formulates and produces a sentence, for example to be provided in response to a user query. The text to speech 240 synthesizes the produced sentence into speech by using a speech synthesis engine. Lastly, the smart speaker may 101 output the synthesized speech signal as audio.

Speech recognition technology is divided into model learning and recognition using learned models, wherein a technology of learning an acoustic model and a language model represents the core technology of speech recognition. An artificial intelligence algorithm may be utilized in the process of learning the acoustic model and the language model, and the process of speech synthesis.

Unlike in video processing, the type of raw data in speech data analysis is one-dimensional data, and speech data analysis has a time-series characteristic. Accordingly, a deep learning method for time-serial processing is commonly utilized in speech data analysis. Deep learning may be applied in a speech data analysis method that is performed according to a time-serial processing method using an artificial neural network, such as a recurrent neural network (RNN) structure. An RNN structure is a configuration in which a loop is added to an existing hidden layer. RNN may be utilized not only for speech recognition but also for natural language processing.

Figure 3:
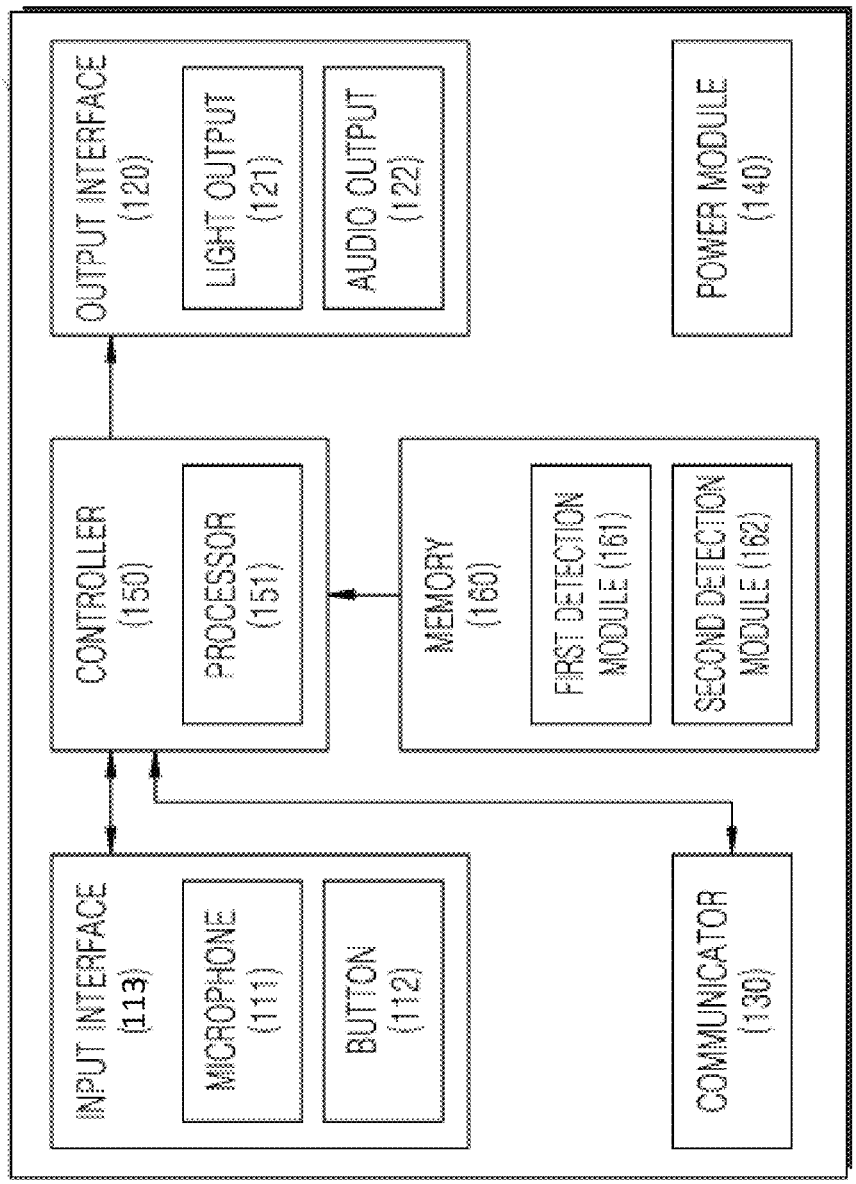
FIG. 3 is a block diagram of a configuration of an edge device in accordance with some implementations.

FIG. 3 is a block diagram of an AI device 110, such as speech recognition apparatus according to an exemplary embodiment of the present disclosure.

Referring to FIG. 3, the speech recognition apparatus 110 for speech recognition according to an exemplary embodiment of the present disclosure may be configured to include an input interface 113, an output interface 120, a communicator 130—such as a transceiver, a power module 140, one or more controllers 150, and a memory 160.

The input interface 110 and the output interface 120 may serve as interfaces with various external devices that can be communicatively coupled to the speech recognition apparatus 100.

The input interface 110 may include a microphone 111, which converts speech into a speech signal, and one or more buttons 112 which may be used for controlling output volume, or triggering a wake or other function of the device. In addition, the input interface 110 may include any of wired or wireless data ports, memory card ports, audio/video input/output ports, or the like.

The input interface 110 may also include one or more sensors (not depicted) which may obtain at least one of internal information of the device, surrounding environment information of the device, or user information by using various sensors. The sensor may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output interface 120 may include one or more light outputs 121 and one or more audio outputs 122. The light output 121 may indicate the state of the speech recognition apparatus 110 using one or more LEDs emitting different colors or patterns. For example, the light output 121 may distinguish a state in which the speech recognition apparatus 110 has been activated by a wake-up word, a state in which an utterance has been cancelled by the cancellation command, or a state of outputting responsive results, using different color output light to indicate each different state.

The output interface 120 may also include other types of output modules, not depicted, which are known to those of ordinary skill in the art, including for example, vibration outputs, haptic or tactile outputs, thermal outputs, or the like.

The audio output 122 may output synthesized speech by using an acoustic device, such as one or more speakers. In addition, the output interface 120 may include wired or wireless headset ports, wired or wireless data ports, ports for coupling an external output device, and the like.

The communicator 130 may be included for connecting the speech recognition apparatus 110 to the network 400, or directly to other devices or servers, which includes wireless communication networks such as 3G, 4G, and 5G networks, and the Internet, in order to transmit and receive data. The speech recognition apparatus 110 may transmit and receive text data and speech data by using the communicator 130. The communicator 130 may be configured to include, for example, at least one of various wired or wireless Internet modules, a short-range communication module, a GPS module, and a modem for mobile communication, or the like.

The wireless Internet module is a module for wireless Internet connection. The wireless Internet module is configured to transmit and receive a wireless signal in a communication network according to wireless Internet technologies. The wireless Internet technology may include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like.

The short-range communication module may support short range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The power module 140 may include one or more battery units, circuitries for charge and discharge, and external charger ports.

The memory 160 may store data supporting various functions of the device 110. For example, the memory 160 may store input data, the learning data, the learning model, learning history, or the like, obtained from the input interface 113.

The memory 160 may serve to temporarily or permanently store data processed by the processor 150. Here, the memory 160 may include magnetic storage media or flash storage media, but the scope of the present disclosure is not limited thereto. The memory 160 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

In some embodiments, the memory 160 may be configured to include a first detection module 161 and a second detection module 162, however other embodiments are considered to include more or fewer. The first detection module 161 may be configured to detect a first wake up keyword preset at the device 110, and the second detection module 162 may be configured to detect a second wake up keyword preset at the device 110. In some embodiments, a single detection module may be pretrained and prestored in the memory which is trained to detect multiple wake up keywords using the single stored module. The user may be provided with settings options to select a particular wake up keyword among a few preset and preconfigured wake up keywords, corresponding to the pretrained and prestored first and second detection modules 161, 162. While this provides some level of customization, as discussed above, the user is unable to change the settings to select any wake up keyword that the user may desire, and the user is instead limited to only a few preset keywords configured for the device.

The one or more controllers 150 may include a processor 151. In some cases, the terms controller and processor may be used interchangeably. The processor 151 may control the components of the device, including the input interface 110, the output interface 120, the communicator 130, and the power module 140, and may control detection of utterances and wake up keywords based on learning models stored in the memory 160.

The one or more processors 151 may perform pre-processing for inputted audio. For example, sounds received via the input interface 113 are converted into audio signals, which may be converted to digital signals through a sampling process. The processor 151 may perform pre-processing to remove noise from the digital signal, excluding a particular aspect of the digital signal, such as a voice of the user.

The processor 151 may determine at least one executable operation of the edge device 110 based on information determined or generated by using a data analysis algorithm or a machine learning algorithm. In addition, the processor 151 may control components of the edge device 110 to perform the determined operation.

To this end, the processor 151 may request, retrieve, receive, or use data of the processor or the memory 160, and may control components of the edge device 110 to execute a predicted operation or an operation determined to be preferable of the at least one executable operation.

In this case, when it is required to be linked with the external device to perform the determined operation, the processor 151 may generate a control signal for controlling the external device and transmit the generated control signal to the corresponding external device.

The processor 151 obtains intent information about user input, and may determine a requirement of a user based on the obtained intent information. The processor 151 may obtain intent information corresponding to user input by using at least one of a speech to text (STT) engine for converting voice input into a character string or a natural language processing (NLP) engine for obtaining intent information of a natural language.

In an implementation, the at least one of the STT engine or the NLP engine may be composed of artificial neural networks, some of which are trained according to a machine learning algorithm. In addition, the at least one of the STT engine or the NLP engine may be trained by one or more processors 151, trained by a learning processor of an AI server, or trained by distributed processing thereof.

The processor 151 may collect history information including, for example, operation contents and user feedback on an operation of the edge device 110, and stores the history information in the memory 160, or transmits the history information to an external device such as an AI server (e.g., the AI server shown in FIG. 1). The collected history information may be used to update a learning model.

The processor 151 may control at least some of components of the edge device 110 to drive an application stored in the memory 160. Furthermore, the processor 151 may operate two or more components included in the edge device 110 in combination with each other to drive the application.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
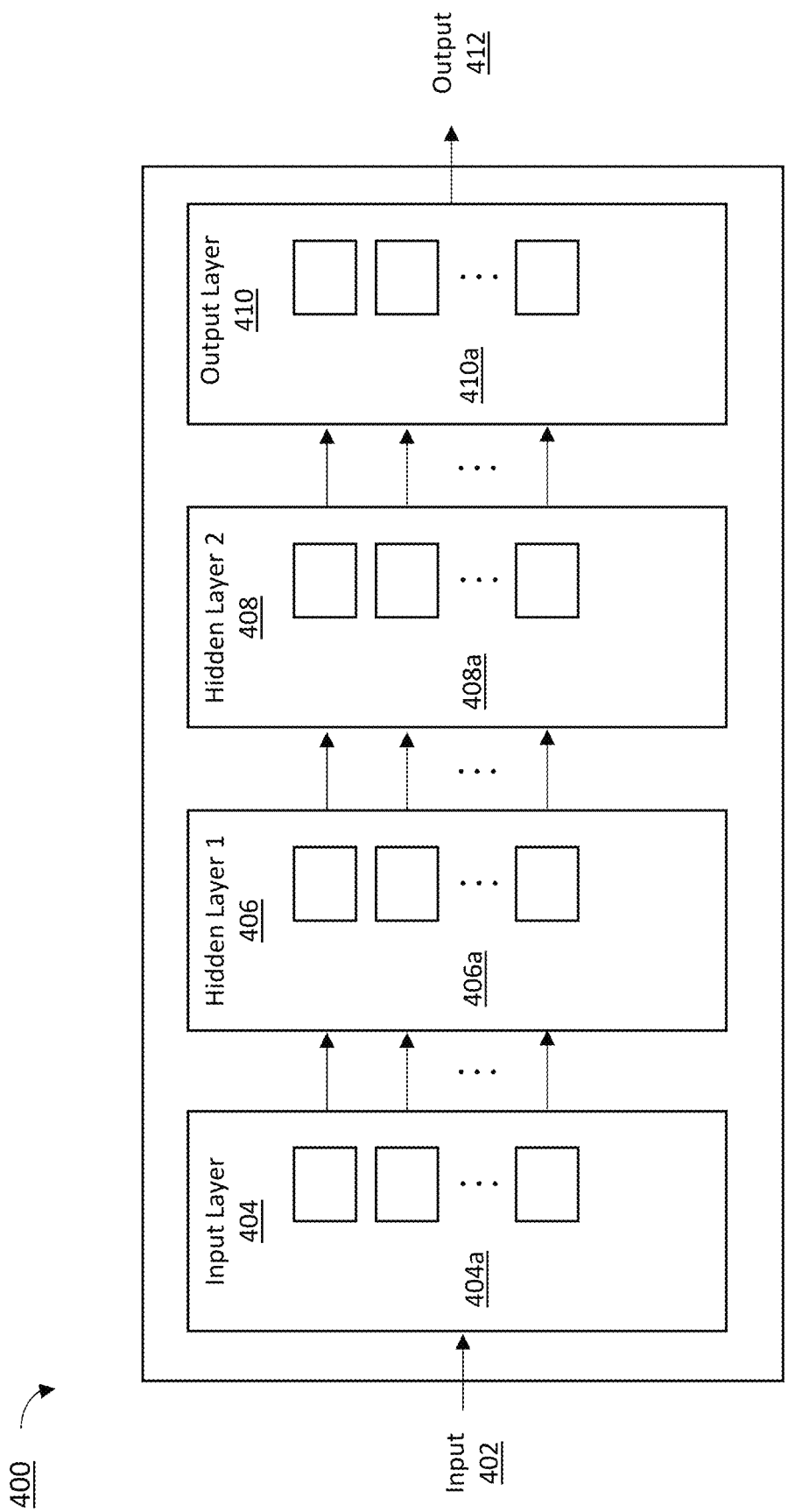
FIG. 4 is an example neural network in accordance with some implementations.

FIG. 4 is a block diagram of an example neural network 400 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 400 includes an input layer 402, a first hidden layer 406, a second hidden layer 408, and an output layer 410. While the neural network 400 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 404 is coupled (e.g., configured) to receive various inputs 402 (e.g., audio data). For example, the input layer 404 receives audio data from preprocessing. In various implementations, the input layer 404 includes a number of long short-term memory (LSTM) logic units 404a, which are also referred to as model(s) of neurons by those of ordinary skill in the art. In some such implementations, an input matrix from the features to the LSTM logic units 404a include rectangular matrices. For example, the size of this matrix is a function of the number of features included in the feature stream.

In some implementations, the first hidden layer 406 includes a number of LSTM logic units 306a. In some implementations, the number of LSTM logic units 406a ranges between approximately 10-500. Those of ordinary skill in the art will appreciate that, in such implementations, the number of LSTM logic units per layer is orders of magnitude smaller than previously known approaches (being of the order of O($10^1$) to O($10^2$)), which allows such implementations to be embedded in highly resource-constrained devices. As illustrated in the example of FIG. 4, the first hidden layer 406 receives its inputs from the input layer 404. For example, the first hidden layer 406 performs one or more of following: a convolutional operation, a nonlinearity operation, a normalization operation, a pooling operation, or the like.

In some implementations, the second hidden layer 408 includes a number of LSTM logic units 408a. In some implementations, the number of LSTM logic units 408a is the same as or similar to the number of LSTM logic units 404a in the input layer 404 or the number of LSTM logic units 406a in the first hidden layer 406. As illustrated in the example of FIG. 4, the second hidden layer 408 receives its inputs from the first hidden layer 406. Additionally, and/or alternatively, in some implementations, the second hidden layer 408 receives its inputs from the input layer 406. For example, the second hidden layer 408 performs one or more of following: a convolutional operation, a nonlinearity operation, a normalization operation, a pooling operation, and/or the like.

In some implementations, the output layer 410 includes a number of LSTM logic units 410a. In some implementations, the number of LSTM logic units 410a is the same as or similar to the number of LSTM logic units 404a in the input layer 404, the number of LSTM logic units 406a in the first hidden layer 406, or the number of LSTM logic units 408a in the second hidden layer 408. In some implementations, the output layer 410 is a task-dependent layer that performs a computer vision related task such as feature extraction, object recognition, object detection, pose estimation, or the like. In some implementations, the output layer 410 includes an implementation of a multinomial logistic function (e.g., a soft-max function) that produces a number of outputs 412.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Considering the above, we turn to the approach disclosed by the embodiments of the present disclosure, including a device and method for open vocabulary keyword spotting. Keyword spotting is the key starting point of voice interactions between humans and smart devices. These devices constantly listen to their environment and only get triggered or woken up by certain keywords. The ability for a user to register a user-preferred keyword would enable more personalized and enjoyable user interactions. The main challenge of such systems is that the keywords can be out of the training distribution and the system should also be small and efficient enough to run on an edge device with low latency.

Embodiments of the present disclosure include a convolution architecture model stored at an edge device configured to generate a low dimensional embedding based on the keyword's acoustic information. Thus, when the audio input of a new keyword set by the user as a wake up word of the device is received, the model may generate a low dimensional embedding representation without transmitting the example input to the AI server or other more robust computing system. the model at the edge device may be configured to generate the embedding representation of the new keyword for storage at the memory in the device.

As the edge device continually receives audio when deployed in a actual use environment, the device and model may be configured to parse and extract portions of input audio for input to the model, generate corresponding low dimensional embedding representations of each audio input, and perform a comparison in the feature space between the input embedding representation and the stored keyword embedding representation, and determine whether a user has uttered the newly set wake up keyword, using a comparison threshold within the feature space.

Many open-vocabulary keyword spotting systems rely on a Query-by-Example (QbyE) approach to tackle the problem. Some existing approaches use a distance function to compare the embeddings between the enrollment and query keywords. If the distance is smaller than a certain threshold, the query is considered to be the same keyword as the enrollment, thus triggering the system. A QbyE model usually has an encoder to convert the input audio signal to an embedding in vector space and a decoder (last few layers of an ANN) to maximize the distance between different class embeddings while minimizing the distances of those that belong to the same class.

Most of the QbyE systems in literature use Recurrent Neural Networks (RNNs) as the encoder to extract the embeddings since RNNs can project variable-duration inputs onto a fixed-size vector representation. Convolutional Neural Networks (CNN) based models, on the other hand, have been successfully used in several audio tasks such as acoustic scene classification and sound event detection, achieving state of the art results. A CNN approach using bottleneck features has been proposed and shown to outperform Dynamic Time Warping (DTW) approaches in low-resource QbyE STD tasks.

According to embodiments of the present disclosure, an edge device friendly CNN architecture inspired by the MLPMixer advancement are considered.

MLP-Mixer is a recently proposed neural network architecture for image classification tasks in computer vision. It is based on the idea of per-patch processing, where each patch of an image is independently processed before being combined with other patches to obtain a global representation of the image.

The basic idea behind MLP-Mixer is to use multiple layers of mixer blocks, each consisting of two separate operations: channel mixing and spatial mixing. In the channel mixing operation, a multi-layer perceptron (MLP) is applied to the channels of each patch independently, allowing for non-linear transformations of the patch features. In the spatial mixing operation, a global average pooling is performed over the patch dimensions, followed by another MLP applied to the resulting global feature map.

By alternating these two operations, MLP-Mixer can capture both local and global features of the image, while also allowing for non-linear transformations of the feature representations.

In an example of the disclosed embodiments, 81-dimensional Mel-frequency Cepstral Coefficients (MFCCs) are extracted from 1 second long audio, with a window of 25 ms and stride of 12.5 ms to be used as input to the model. This provides the features with the following dimensions: 1 channel×81 MFCCs×81 time steps. However, the disclosure is not limited thereto, and various other numbers of dimensional values along the feature space and the temporal space may be considered as will be appreciated by those of ordinary skill in the art. In some embodiments, cepstral mean and variance normalization (CMVN) is applied on the temporal dimension to normalize the MFCC features. Since the channel dimension is 1, this dimension is omitted for the purposes of clarity in the disclosure.

Figure 5A:
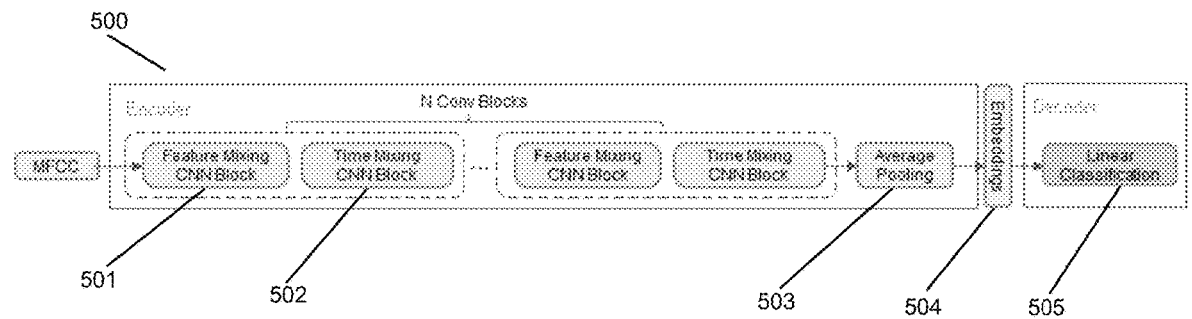
FIG. 5A is a diagram showing an MLPMixer based encoder/decoder architecture according to an embodiment of the present disclosure.

Referring to FIG. 5, a diagram showing an encoder-decoder system architecture 500 according to an embodiment of the present disclosure is depicted. Based on the system 500, the encoder network processes a user's keyword at enrollment, or portions of query audio, for mapping the acoustic information to a low dimensional embedding. A simple fully connected linear classifier is added on top of the embeddings and may be used only during training.

For the original MLP Mixer model, the input image was split into non-overlapping patches and the embedding of each patch was computed before feeding it to the MLPMixer blocks. Embodiments of the present disclosure keep the feature and the timesteps dimension intact and use the 81 features across 81 timesteps directly as input to the model. The reason behind this is twofold: the MLPMixer's capability on extracting information from the entire receptive field may be tested, and this approach results in saving significant space and computational operation.

Unlike the original MLPMixer which applied the mixer first on flattened image embedding patches (i.e., token-mixing) and then applied the mixer on the channel dimension (i.e., channel-mixing), embodiments of the present disclosure apply the mixer on the feature (e.g., frequency, or the like) and temporal dimensions. Specifically, a linear layer is directly applied to the normalized features to project the feature dimension f to a hidden dimension h, see FIG. 5B, followed by another linear layer to project the hidden dimension h back to f, see FIG. 5C.

The two linear layers form the major components of an MLP block. The first MLP block is referred to as feature-mixing 501, see also FIG. 5C. Similarly, two linear layers are applied on the temporal space to project the time dimension t to a hidden dimension g and then project g back to t, at the time mixing MLP block 502, for example, see also FIG. 5C.

Thus, for a given input $X \in \mathbb{R}^{f \times t}$ (since there is only one channel, the channel dimension is omitted for simplicity), the feature mixing MLP block is implemented by the following Equation 1:

$$U = X + W_2\sigma(W_1 \text{LayerNorm}(X)) \quad \text{Equation 1}$$

Where $X \in \mathbb{R}^{f \times t}$ denotes the extracted features, $W_1 \in \mathbb{R}^{h \times f}$ and $W_2 \in \mathbb{R}^{f \times h}$ are the weights in the first and second linear layer in an MLP block respectively. LayerNorm and activation function σ are also added in each MLP block.

In some embodiments, the activation function known as HardSwish is used as the activation function as it has shown improved performance as compared to other activation functions, however this disclosure is not limited thereto, and those of ordinary skill in the art will appreciate other appropriate activation functions being considered.

Figure 5B:
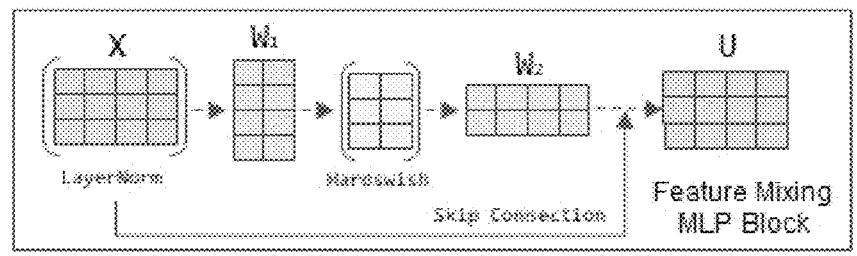
FIGS. 5B and 5C are diagrams showing a Feature Mixing MLP Block and a Time Mixing MLP Block according to an embodiment of the present disclosure.
Figure 5C:
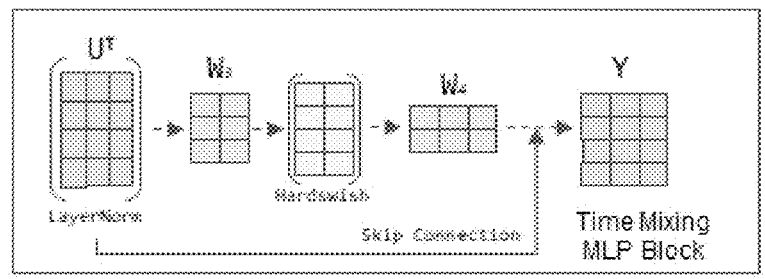

In some embodiments, a residual connection is added to link the projection from MLP block and the original input X to form the final projection $U \in \mathbb{R}^{f \times t}$ on the feature dimension, see FIG. 5B. Similarly, the same set of operations are applied on $U^T \in \mathbb{R}^{t \times f}$ to mix information on the temporal dimension, see FIG. 5C, for example given by the following Equation 2:

$$Y = U + (W_4\sigma(W_3 \text{LayerNorm}(U^T)))^T \quad \text{Equation 2}$$

Where $W_3 \in \mathbb{R}^{g \times t}$ and $W_4 \in \mathbb{R}^{t \times g}$ are the weights in the two fully-connected layers in time-mixing MLP block. $Y \in \mathbb{R}^{f \times t}$ is the projection on the temporal dimension.

Each layer in the MLP block generates the same output size as the input. For example, regardless of how the dimensions of the hidden space h and g in each MLP block are configured, the output from the MLP block is always f×t. Because of this configuration, the MLP blocks can be stacked together, and tuning is performed for parameters on h, g and number of stacked blocks n, which may provide straightforward parameter tuning.

In some embodiments, the output of the MLPMixer is passed to an average pooling layer 503 to further extract the information from the temporal dimension. Formally, for an output from MLP block $X \in \mathbb{R}^{f \times t}$ result of applying the average pooling operation on the temporal dimension is provided by Equation 3:

$$z = \frac{1}{t}\sum_{j=1}^{t} y(i, j) \quad \text{Equation 3}$$

Where $Z \in \mathbb{R}^f$ is the embedding 504 generated from the encoder. During training time, a linear classifier layer 505 is added on top of z to train the network.

According to some embodiments, during implementation of the edge device in an environment receiving audio inputs, for inference and detection of the set wake up keyword, the linear layer from the decoder is dropped and the embedding output from the average pooling layer is used. Since in the example embodiments, the model is trained on one second long audio samples, for any input audio, a moving window of one second with a stride of 100 ms is used to feed into the network.

For example, a two second long enrollment audio will be split into 11 one second long frames, therefore 11 embeddings will be generated from those frames. The cosine distance is then used to compare the similarity between the embedding vector ($z_q$) generated from the query audio and each of the n embedding vectors saved from enrollment ($z_{e,i}$).

In some embodiments, when calculating the cosine distance, if the enrollment embedding is shorter than the query embedding, the enrollment embedding is convolved with the query embedding and the minimum distance is used. Conversely, if the enrollment embedding was longer than the query embedding, the left side of the query embedding vector is zero padded to match the size of the enrollment embedding. In some embodiments, in a streaming situation, padding is not necessary, as the buffer size can be defined as the same as the enrollment embeddings to make the sizes match.

Given an enrollment and query embeddings of size n, the cosine distance between both embeddings generates n distances. This is done for the other enrollment embeddings and the minimum distance may then be computed. The minimum distance given by the following Equation 4 is compared to a threshold to make the triggering decision:

$$dist = \text{minimum}\left(\frac{z_q \cdot z_{e,i}}{\|z_q\|\|z_{e,i}\|}\right), \text{ where } i \in 1 \ldots n \quad \text{Equation 4}$$

If dist is smaller than the set threshold, the system triggers a positive response, and the device is triggered as detecting an enrolled wake up keyword. In some embodiments, the embedding size is the same as MFCC feature dimensions (81), which is considerably small compared to other baseline models which have an embedding size on the order of 1000. In some cases, the smaller embedding size also shows that the MLPMixer is able to effectively project the useful information to a small dimensional space.

In another embodiment of the present disclosure, a convolution mixer architecture for open vocabulary keyword spotting is considered. In some recent studies, MLPMixer was adapted to the QbyE open-vocabulary keyword spotting problem and outperformed some of the state-of-the-art CNN and RNN models. The MLPs can be viewed as a special case of CNNs (e.g., with 1×1 convolutions). However, since CNNs provide more flexibility, embodiments of the present disclosure consider first constructing a convolutional equivalent version of the MLPMixer, referred to herein as a ConvMixer.

In some embodiments, different mechanisms that were generally used in light-weight CNNs are added to the ConvMixer to improve performance. For example, depth-wise convolution, Squeeze and Excitation (SE) layer, replacing the convolution with dynamic convolution-discussed further below—are considered for adding to the small footprint ConvMixer.

Similar to the MLPMixer, in an example embodiment, an 81-dimensional Mel-frequency Cepstral Coefficients (MFCCs) with 128 mel filterbanks extracted from 1 s long audio with window of 25 ms and stride of 12.5 ms may be used as input to the model. The resulting features are generated with the following dimensions: 1 channel×81 MFCCs×81 time steps. As noted, the disclosure is not limited thereto, and various other numbers of dimensional values along the feature space and the temporal space may be considered as will be appreciated by those of ordinary skill in the art. CMVN may be applied on the temporal dimension to normalize the MFCC features 601. Since the channel dimension is 1, the channel dimension is omitted for the purposes of this disclosure.

An example of the system according to an embodiment is depicted in FIG. 6. The keyword's acoustic information can be mapped to a low dimensional embedding, and a simple fully connected linear classifier is added on top of the embeddings and used only during training.

A linear layer can be seen as 1×1 convolution or single-channel depth-wise convolution of the entire receptive field. Based on the 1×1 convolution interpretation, the embodiments first consider the feature dimension m from the input $X \in \mathbb{R}^{m \times n}$ as the channel dimension, and apply two 1×1 convolutions ($W_1$ and $W_2$), 620, 621, to X to form the feature mixing output $U \in \mathbb{R}^{m \times n}$, 622. The temporal dimension from U is used as the input channels to another two 1×1 convolutions ($W_3$ and $W_4$), 623, 624, to form the time mixing output $Y \in \mathbb{R}^{m \times n}$, 625. This is provided by the following Equations 5 and 6:

$$U = X + SE(\sigma(X*W_1))*W_2 \quad \text{Equation 5}$$

$$Y = U + (SE(\sigma(U^T*W_3))*W_4)^T \quad \text{Equation 6}$$

For feature mixing, first, $W_1 \in \mathbb{R}^{m \times g}$ is used to change the input channel from m to g, then $W_2 \in \mathbb{R}^{g \times m}$ is used to project the channel from g back to m, so that the residual connection can be applied. In some embodiments ReLU is used as the activation function U, however the present disclosure is not limited thereto, and one of ordinary skill in the art will appreciate that alternate appropriate activation functions may be used. With the output U from feature mixing, the transpose of the output U is taken to perform similar operations on it to generate the time mixing output Y, similar to the MLPMixer embodiment discussed above.

Thus, $W_3 \in \mathbb{R}^{n \times h}$ projects the channel dimension from n to h and $W_4 \in \mathbb{R}^{h \times n}$ projects it back to n. Similar to the MLPMixer based embodiment, a modular architecture may be utilized to keep the model size small.

Additionally, in some embodiments, between two convolution layers in each mixing block, a Squeeze and Excitation (SE) layer 626 may be added to improve model performance, where SE may be considered a channel attention mechanism. The SE layer first uses global average pooling to reduce the feature map to a singular value on each channel, which changes the feature map size from C×F to C×1, where C is the channel dimension and F is the feature dimension. The SE layer may then use a Fully Connected (FC) layer to project the "squeezed" feature C×1 to a bottleneck hidden layer with size C/γ, where γ is a reduction factor. In some cases, for example, γ may be equal to 4 as the default value for the SE layer, however the disclosure is not limited to this.

Additionally, another FC layer may be used to project the hidden space back to C×1. The ReLU activation function may be used after the first FC and sigmoid activation after the second FC. This output is then used to scale the channels of the input to the SE layer.

In comparison to the above MLPMixer based embodiment, LayerNorm may be removed from the ConvMixer in some embodiments of the present disclosure.

In some embodiments, dynamic convolution may be incorporated into the model. Dynamic convolution improves the performance of small vision models by introducing a small computational overhead. Dynamic convolution applies the SE attention mechanism to convolution kernels. Specifically, it replaces the traditional single convolution kernel W with K convolution kernels $\tilde{W}_k$ and aggregates them together using softmax weights. In some embodiments, K=4 convolutional kernels are used in the model. The weights for each kernel are dependent on the input, so different inputs will result in different weights for each kernel. The weights and kernels are aggregated dynamically as given by Equation 7 as follows, see also FIG. 6B.

$$\tilde{W}=\Sigma_k \pi_k(X) * \tilde{W}_k \qquad \text{Equation 7}$$

Extra MACs are introduced by computing the attentions $\pi_k(X)$ and aggregating the kernels, and extra parameters are introduced by the K parallel convolution kernels. It is important to note that the attention weights are calculated using the computationally efficient SE layer (the same SE concept mentioned above, but with softmax instead of sigmoid). Therefore, given that the kernel size is 1×1, this only adds 33.8K parameters and 672K multiply accumulates (MACs). The dynamic convolution is plugged into the ConvMixer model by replacing all the $\tilde{W}_i$ with $\tilde{W}_i$ (i=1, 2, 3, 4) in Equations 5 and 6.

Figure 7:
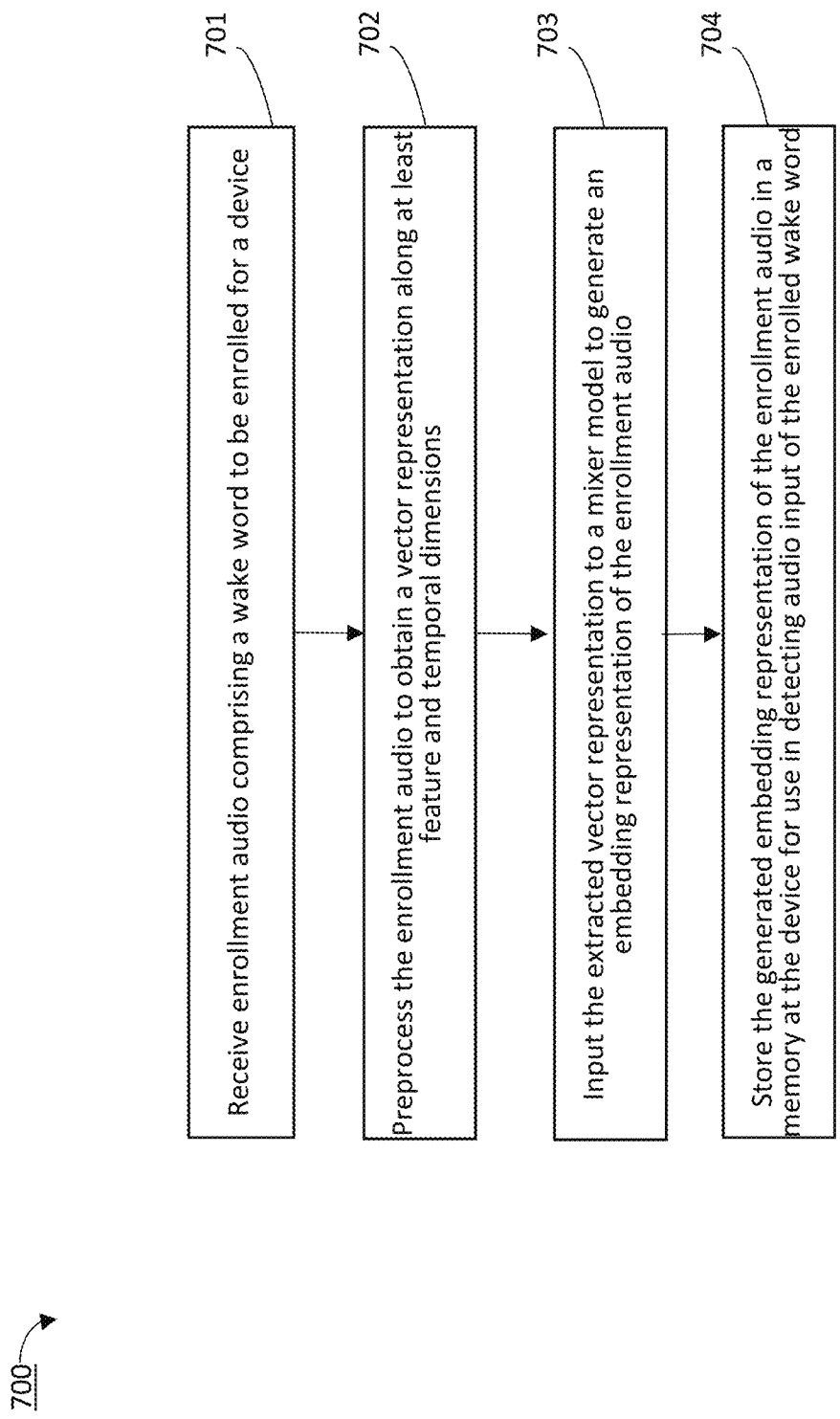
FIG. 7 is a flowchart showing a method for enrollment of a user defined keyword according to an embodiment of the present disclosure.

FIG. 7 is a flowchart representation of a method for enrolling a user defined wake word for a device according to an embodiment of the present disclosure. In some implementations, the method 700 is performed by a device with one or more processors and non-transitory memory, such as one of the AI devices 110 shown in FIG. 1 or the AI device 200 shown in FIG. 2. In some embodiments, the method 700 is implemented as a set of computer readable instructions that are executed at a device.

In an embodiment, the method 700 includes receiving enrollment audio from user comprising a wake word to be enrolled for a device 701. The enrollment audio may be received via an input interface, such as a microphone of the AI device 110, or may be received at the AI device via another form of data/audio transmission.

In some embodiments, the method 700 further includes preprocessing the enrollment audio to obtain a vector representation of the enrollment audio along a feature dimension and a time dimension, 702. For example, as discussed above this may include extracting 81-dimensional Mel-frequency Cepstral Coefficients (MFCCs) from 1 second of audio, with a window of 25 ms and stride of 12.5 ms. This provides the vector with the following dimensions: 1 channel×81 MFCCs×81 time steps.

The method may further include inputting the extracted vector representation to a mixer model to generate an embedding representation of the enrollment audio, 703. The mixer model may be implemented as the MLPMixer model discussed above, or the ConvMixer model discussed above. For example, the mixer may be applied on the feature (e.g., frequency, or the like) and temporal dimensions. Specifically, a linear layer may be directly applied to the normalized features to project the feature dimension to a hidden dimension, followed by another linear layer to project the hidden dimension back to the feature dimension.

The two layers form the major components of a mixer block. In the example of the MLPMixer, the first MLP block is referred to as feature-mixing block, see, e.g., FIG. 5B, where two linear layers are applied on the feature space to project the feature dimension to a hidden dimension, and then project the hidden dimension back to the feature dimension. Similarly, two linear layers of a time-mixing block are applied on the temporal space to project the time dimension to a hidden dimension, and then project the hidden dimension back to the time dimension, see also FIG. 5C. Thus, each mixing block may comprise two layers and the feature dimension and the temporal dimension of an output of a first layer are flipped for inputting to a second layer of the mixing block.

The method 700 may further include storing the generated embedding representation of the enrollment audio in a memory at the device for use in detecting audio input of the enrolled wake word. Based on the encoding model, useful information from the enrollment audio may be extracted from high dimensional data to the generated embedding in low dimensional hidden space. Due to the low dimensional representative embedding, the AI device, including deployed edge devices having limited computing and memory resources, may be capable of processing, generating, and storing low dimensional representative embeddings for accurate similarly detection with query embeddings, generated using query audio encoded using the same encoding model.

Figure 8:
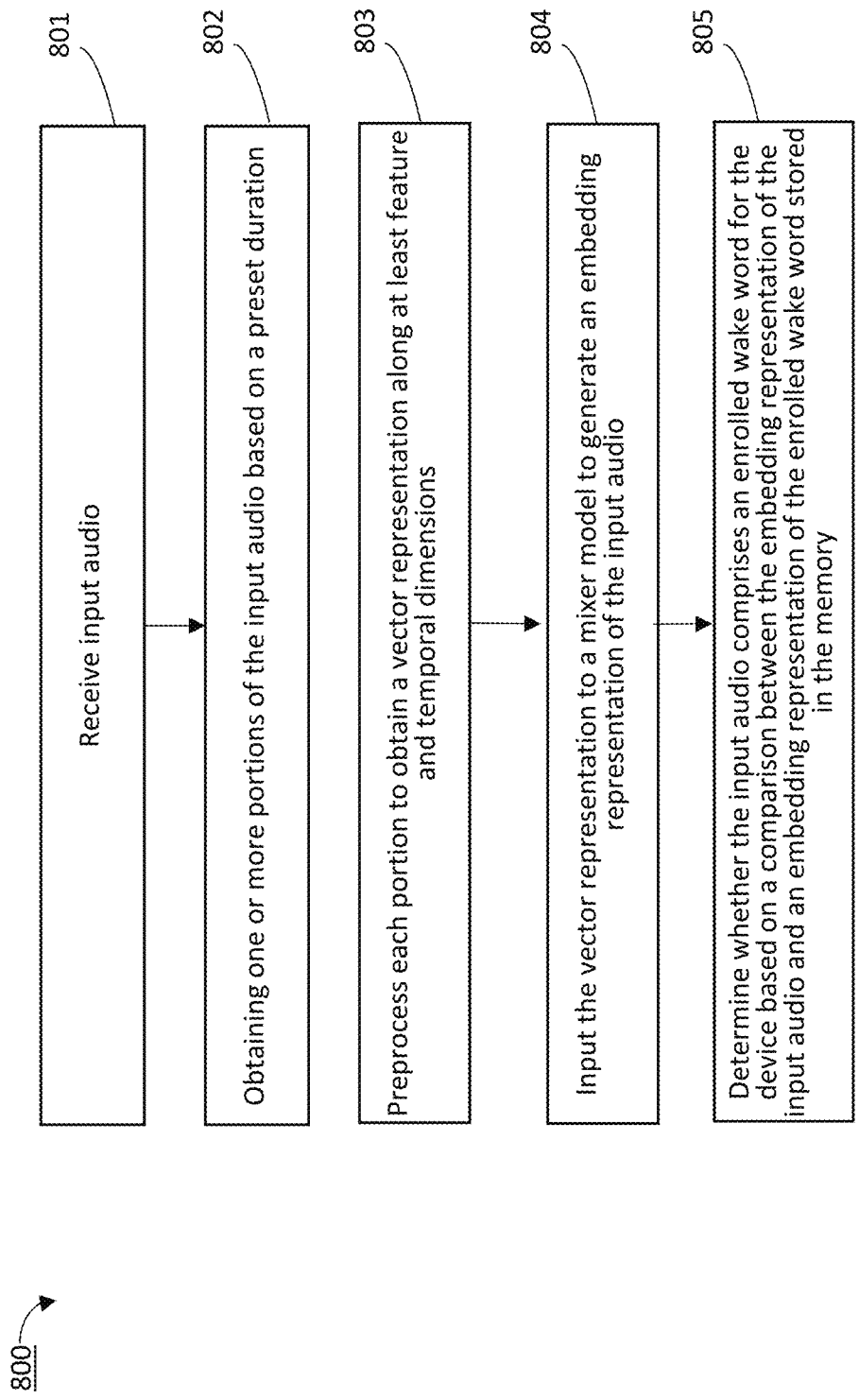
FIG. 8 is a flowchart showing a method for detecting a user defined keyword in query input according to an embodiment of the present disclosure.

FIG. 8 provides an example of a method 800 of detecting a wake word in received input audio according to an embodiment of the present disclosure. In an embodiment, the method 800 may include receiving input audio via an input interface at the device, which potentially includes a wake word enrolled for the device 801. The method may further include obtaining one or more portions of the received input audio based on a preset duration 802, and preprocessing each portion to obtain a vector representation of each portion along at least feature and temporal dimensions 804.

The method 800 may further include determining whether the input audio comprises an enrolled wake word for the device based on a comparison between the embedding representation of the input audio and an embedding representation of the enrolled wake word stored in the memory, 805. For example, a cosine distance between the embedding vectors may be used to compare the similarity between the query audio embedding and each of the embedding vectors saved in the memory from enrollment.

In some embodiments, if the enrollment embedding is shorter than the query embedding, the enrollment embedding is convolved with the query embedding and the minimum distance is used. Conversely, if the enrollment embedding was longer than the query embedding, the left side of the query embedding vector may be zero padded to match the size of the enrollment embedding.

Where more than one embedding is generated for the input audio, the embedding having a minimum cosine distance with respect to the stored enrolled embedding may be used, and the minimum distance may be compared to a preset similarity threshold for determining whether the wake word has been detected.

MLPMixer Performance Experiment Results

To determine performance of the MLPMixer embodiments of the present disclosure, some examples of experimental results are provided. In an example, the MLPMixer model was trained using the dataset Librispeech, which comprises 1000 hours of English being read from audio books in a quiet environment, sampled at 16 kHz along with annotated text for supervision. Further, the Montreal Forced Aligner tool was used to generate word level annotated segmentation. After the force alignment, each word was forced to one second long durations, by random clipping or zero padding on both sides of the audio depending on whether the audio of the word was longer or shorter than one second duration.

The training data was augmented with random background noise ranging from 4 to 12 dB from the "noise-train" folder in the Microsoft Scalable Noisy Speech Dataset (MS-SNSD). In addition, random synthetic far-field effects were added with 0.5 probability of adding 4 to 15 dB point source noise on top of the far-field effect. Additionally, SpecAugment—which is a data augmentation method for speech recognition applied directly to the feature inputs of a neural network (i.e., filter bank coefficients) consisting of warping the features, masking blocks of frequency channels, and masking blocks of time steps—was applied to improve the generalization ability of the models. Cross entropy loss was used as the objective function. Internal datasets and a publicly available Hey Snips dataset were used to evaluate the model.

Positive Queries

The test portion of the Hey Snips dataset and an internal dataset were used to test the model. Hey-Snips dataset contains positive samples of a single keyword: "hey snips." The test portion of the Hey Snips dataset contains 2,588 positive utterances from 520 speakers with a maximum of 10 utterances per speaker. Since multiple keyword recordings are needed from the same speaker to perform the evaluation, all the speakers with 10 keyword utterances were selected and the first three utterances were used for enrollment and the remaining seven utterances were used as query inputs. This reduced the number of speakers down to 40.

The internal dataset contained 8 keywords: "LG Styler", "LG Washer", "LG Dryer", "Hey LG", "LG Fridge", "LG Puricare", "LG Oven", and "Hey Cloi". Each keyword was repeated 10 times from 50 speakers. Similar to Hey Snips, the first three utterances were used for enrollment, and the remaining seven were used as query inputs. This resulted in evaluation of 400 speakers. Both datasets were recorded in clean environments, and noise and far-field effects were also synthetically added. Specifically, the "noise-test" folder from MS-SNSD was used to add 10 dB and 6 dB noises. Far-field effects were also added to the clean 10 dB and 6 dB datasets. This resulted in six simulated environmental situations in total.

Negative Queries

The negative samples from Hey Snips test set were used as the negatives to evaluate both Hey Snips and the internal datasets. The negative dataset contains about 20k utterances of general sentences from 1,469 speakers with a maximum of 30 utterances per speaker. Two situations were generated for negative samples. In one situation, 10 dB and 6 dB noise was randomly added from the "noise-test" folder in the MS-SNSD dataset. This negative set is evaluated together with the clean, 10 dB and 6 dB noise positive queries. In the second situation, far-field effects were also added to the first situation. This negative set was evaluated together with the three far-field added positive queries.

Hyperparameter Search

The number of features, the number of layers in the model, the number of dimensions for time and frequency mixing, as well dropout rate and activation function were varied for the experiments. Hundreds of hyperparameter optimization trials were performed using Asynchronous Hyperband Search (ASHA) with the intention of finding a model that has smaller footprint than MobileNetV3 (or has less than 25 M FLOPs and less than 300k parameters). The hyperparameter search yielded a model with 12 mixing blocks containing 64 hidden layers in the time and frequency mixing blocks and no dropout.

Results

The above implementation of an embodiment of the MLPMixer architecture showed better performance under all scenarios compared to state-of-the-art small footprint CNNs and RNNs benchmark models.

Baseline Models

For baseline models, a state-of-the-art RNN model with GRU and self-attention (GRU-ATTN) was selected, which previously reported the open-vocabulary keyword spotting results using the Hey-Snips dataset. In addition, since the state-of-the-art computer vision models shows decent performance on many audio related problems—for example, MobileNetV2 has been used for keyword spotting and audio tagging—during our development, we also find those models show competitive results on open vocabulary keyword spotting. Thus, the state-of-the-art computer vision models were also used as part of the baseline to compare with our model. Specifically, the edge friendly MobileNetV2 and MobileNetV3 were used as reference.

The inputs to vision models usually are images with three color channels, whereas the audio input to the model of the present disclosure has only one channel in some embodiments. In order to make the vision models work for the single channel data, a preprocessing technique was implemented to transfer the single channel audio into three channels and change the input size so that the imagenet pretrained weights can be used. The results showed that models with pretrained weights had significantly better performance than the ones without, even though the link between audio spectrogram and imagenet samples is weak.

Results and Size Comparison

The experiments were designed to answer the following: does the model according to embodiments of the present disclosure have good performance while having similar parameters and MACs to the baseline models? Table 1, below, shows that among the baseline models, GRU-ATTN has the smallest parameter size while MobileNetV3 has the smallest MACs among the baseline models. Based on the results, the MLPMixer according to an embodiment of the present disclosure is able to outperform MobileNetV3 in most cases, especially under challenging 10 dB and 6 dB conditions, while having the lowest number of parameters and MACS among all tested models.

TABLE 1

| Model | Params (M) | MACs (M) |
| --- | --- | --- |
| GRU-ATTN [11] | 0.55 | 41.23 |
| MobileNetV2 [25] | 2.22 | 29.22 |

TABLE 1-continued

| Model | Params (M) | MACs (M) |
| --- | --- | --- |
| MobileNetV3 [19] | 2.97 | 22.24 |
| Ours | 0.25 | 20.16 |

Tables 2 and 3, below, show the False Rejection Rate (FRR) at 0.3 False Acceptance per hour for the Hey-Snips and the LG internal datasets respectively (each showing results in clean, 10 db, and 6 db environments, in respective noisy and far-field effects). The MLPMixer according to an embodiment of the present disclosure performs best among all tested models in all conditions on the Hey-Snips dataset. Compared to MobileNetV3, it shows 5.72% and 11.79% decrease in FRR under "noisy" 10 dB and 6 dB conditions, and 5% to 18% decrease under "Far-field" effects conditions. While MobileNetV3 may show good performance on a clean internal dataset, The MLPMixer according to an embodiment of the present disclosure provides better FRRs under more challenging conditions.

TABLE 2

FFR (%) at 0.3 FA/hour for clean, 10 db, and 6 db on Hey-Snips dataset.

| | Noisy | | | Far-Field | | |
| --- | --- | --- | --- | --- | --- | --- |
| Model | clean | 10 dB | 6 dB | clean | 10 dB | 6 dB |
| GRU-ATTN [11] | 7.86 | 11.79 | 15.71 | 20.00 | 20.64 | 32.50 |
| MobileNetV2 [25] | 5.36 | 12.50 | 20.71 | 14.64 | 15.00 | 35.36 |
| MobileNetV3 [19] | 5.71 | 13.93 | 21.79 | 12.86 | 18.21 | 38.93 |
| Ours | 5.36 | 8.21 | 10.00 | 8.73 | 7.50 | 20.36 |

TABLE 3

FFR (%) at 0.3 FA/hour for clean, 10 db, and 6 db on LG internal dataset.

| | Noisy | | | Far-Field | | |
| --- | --- | --- | --- | --- | --- | --- |
| Model | clean | 10 dB | 6 dB | clean | 10 dB | 6 dB |
| GRU-ATTN [11] | 0.81 | 4.43 | 7.06 | 8.01 | 18.63 | 26.78 |
| MobileNetV2 [25] | 3.54 | 5.38 | 6.84 | 11.25 | 15.44 | 20.09 |
| MobileNetV3 [19] | 0.62 | 3.69 | 5.82 | 3.85 | 11.35 | 16.82 |
| Ours | 2.68 | 3.84 | 4.84 | 5.19 | 8.76 | 12.16 |

Ablation Study

Alternative Input Representations

The original MLPMixer model divides the input image into non-overlapping patches and then computes an embedding for each patch. Although this procedure is effective for images, it may be suboptimal for audio. Instead, partitioning the MFCC features based on time and frequency has been shown to be much more effective.

This approach is simpler to implement and reduces the model's number of parameters by 7k and FLOPs by 500k. In the experiments, the embedding dimension was set to 81 so the internal structure of the model after the embedding layer looked identical to the proposed model. Patching the MFCC features without embedding for completeness were also included.

Table 4, below, shows the results showing that the way in which the input is presented to the model has a direct impact on performance. The difference in performance appears substantial and the mode according to the present disclosure is able to reduce the error rate by more than 40% and 20%, compared to alternative input representations on the Hey Snips and Hey Snapdragon datasets respectively.

TABLE 4

FRR (%) at 0.3 FA/hour for various input representations, where PE indicates patch embeddings.

| Input | Noisy | | Far-Field | |
| --- | --- | --- | --- | --- |
| Representation | Hey Snips | Internal | Hey Snips | Internal |
| with PE | 13.22 | 30.47 | 20.37 | 49.00 |
| w/o PE | 17.02 | 30.33 | 21.67 | 49.43 |
| Ours | 7.86 | 18.68 | 11.67 | 39.20 |

Activation Function

A hyperparameter search showed that the HardSwish activation function is more effective than GELU, which is originally used in the MLPMixer model. Table 5, below, compares the FRR between HardSwish and other popular activation functions on the Hey Snips and Hey Snapdragon datasets. Hardswish was found to perform the best overall while being easier to implement on hardware as compared to GELU and SiLU.

TABLE 5

FRR (%) at 0.3 FA/hour for various activation functions

| | Noisy | | Far-Field | |
| --- | --- | --- | --- | --- |
| Activation | Hey Snips | Hey Snapdragon | Hey Snips | Hey Snapdragon |
| GELU | 8.69 | 20.25 | 13.13 | 42.13 |
| ReLU | 9.76 | 21.89 | 14.90 | 44.00 |
| SiLU | 8.33 | 21.07 | 11.90 | 41.80 |
| HardSwish | 7.86 | 18.68 | 11.67 | 39.20 |

ConvMixer Performance Experiment Results

Regarding performance experiments for the ConvMixer embodiments, the models were trained using the LibriSpeech dataset using the most frequent 10,000 words from LibriSpeech as the output classes. The training procedure included decaying the attention temperature from 34 to 1 in steps of 3 every epoch. During inference, it was observed that adding the temperature parameter serves as a regularization mechanism and improves the performance of the model. This can be attributed to the fact that the testing task is different from the task that is optimized during training. Dividing all attention scores by a temperature of 34 before computing the softmax in the SE layer helped to improve generalization.

Evaluation Dataset

The models were evaluated on two publicly available datasets: Hey-Snips and Hey-Snapdragon. Hey-Snips dataset contains positive samples of a single keyword: "hey snips", and all of the 40 speakers with at least 10 utterances were used from its test set as positive samples for evaluation. The Hey-Snapdragon dataset includes four utterances: "hey android", "hey snapdragon", "hi lumina" and "hi galaxy". The keyword "hi galaxy" has 934 utterances from 42 speakers while the others have 1,112 utterances, each from 50 speakers. For each keyword from each speaker, three utterances were randomly selected for enrolling and the remainder were used for positive querying.

The negative samples in the evaluation were the negative Hey-Snips test set. It contains about 20,000 utterances of general sentences totaling just over 23 hours. For both positive and negative queries, "non-far-field" and "far-field"

effects were added to evaluate the model. For each dataset, 3 scenarios were generated (clean, 10 dB, and 6 dB SNR) under "non far-field" and "far-field" conditions. This resulted in 6 situations in total for positive queries.

To simplify the evaluation, negative samples were augmented into two scenarios: "non far-field" and "far-field". For the "non far-field" negative set, noise was added to the negative samples at 6 dB and 10 dB, then half of the samples were randomly selected from both SNRs and the mixed set was used as the negative set.

Similarly, the same procedure was followed for the negative set of the "far-field" condition but with far-field effects added on top of the noise. For the non-far-field condition, noise was added from the Microsoft Scalable Noisy Speech Dataset (MS-SNSD) to the keywords with 10 dB and 6 dB SNR. For the "far-field" situation, far-field effects were added using the following Equation 8:

$$x_r[t] = x[t] * h_s[t] + \sum_i n_i[t] * h_i[t] \quad \text{Equation 8}$$

Where $x_r[t]$ represents simulated far-field speech, $x[t]$ and $h_s[t]$ represent the audio signal and the corresponding Room Impulse-Response (RIR), $n_i[t]$ and $h_i[t]$ represent a point-source noise and its corresponding MR. Equation 28 is taken from T. Ko, V. Peddinti, D. Povey, M. L. Seltzer, and S. Khudanpur, "A study on data augmentation of reverberant speech for robust speech recognition," in 2017 IEEE International Conference on Acoustics, Speech and Signal Processing (ICASSP). IEEE, 2017, pp. 5220-5224, (hereinafter Ko).

Specifically, we one RIR was randomly selected as $h_s$ to add to the input audio signal x, and another random RIR as $h_i$ to add to a point-source noise sampled from the MS-SNSD noise folder. The noises and RIRs added to the evaluation dataset were "noise-test" from MS-SNSD and "real_rir" from Ko. Note that for training, "noise-train" from MS-SNSD and "simulated_rir" from Ko were used.

Evaluation Method

During the evaluation, it was observed that the Voice Activity Detection (VAD) filtered data reflected the model's performance more accurately since some models are able to obtain good results by being biased by the amount of silence in the audio. For example, enrollment and positive queries tended to have more silence in the beginning and the end of the recorded audio clip than the negative queries due to the methodology with which data was recorded.

A model may show good results by only comparing the silence portion between the enrollment and the query input which results in subpar performance in a real-world streaming setting. Therefore, to emulate real-world conditions, a VAD model was used to remove the silent portions of audio in the Hey-Snips and Hey-Snapdragon datasets. Using the VAD reduced the average utterance length from 3.96 s to 1.69 s for positive Hey-Snips queries and from 1.10 s to 1.01 s for the Hey-Snapdragon queries.

This resulted in all enrollments and positive queries in the evaluation data to be shorter than 2 s. Hence, the size of the enrollment audio was limited to 2 s with a 2 s audio buffer for storing incoming audio during the query phase. Since the model was trained on 1 s long audio, the input audio was parsed into is long chunks with a stride of 100 ms. For example, a 2 s long audio produces eleven 1 s chunks, which are then fed to the model to produce 11 embeddings q. To match the size between the enrollments and the query, the enrollment embeddings e were convolved with the query embeddings q. The cosine distance between the e and q was then computed.

Typically, multiple distances are generated from each enrollment $e_i$. These distances can be aggregated (i.e., micro-aggregation) to form a final distance $d_i$ for each $e_i$. On top of that, another aggregation (i.e., macro-aggregation) can be applied to $d_i$ to generate the final decision value d.

From the performance experiments, it was shown that mean macro-aggregation and minimum micro-aggregation gave the best results among the four different combinations of mean and minimum functions for macro and micro-aggregation. In order to make the negative samples simulate the streaming setting without concatenating it, 2 s long windows were extracted from the query samples. Any samples shorter than 2 s were randomly zero padded on both sides. For the 10 dB and 6 dB environments, noise was added to the extracted query at the corresponding SNR.

Results

Model Construction

In this section, different components were assembled together in a model DyConvMixer according to an embodiment of the present disclosure. The convolutional equivalent of the MLPMixer was used without LayerNorm as the base model. Also, components such as depth-wise convolution and SE were included by adding them between the two convolutional layers in the convolution blocks. These components were successfully used in MobileNet and Efficient-Net and resulted in improved performance. The depth-wise convolution layer used the same number of input and output channels output by the first convolutional layer in the convolution block. In addition, dynamic convolution performance was measured which was specifically designed for improving the performance of small models. Added to that, the effectiveness of LayerNorm was determined since it was used in the original MLPMixer architecture.

As shown in Table 6, below, (for simplicity, the averaged FRR across clean, 10 dB and 6 dB are shown), adding LayerNorm (LN) and depth-wise convolution (Depth) to the ConvMixer degraded its performance.

TABLE 6

FRR (%) at 0.3 FA/hour for various components

| | Non far-field | | Far-field | |
|---|---|---|---|---|
| Model | Hey-Snips | Snapdragon | Hey-Snips | Snapdragon |
| Base | 23.69 | 15.06 | 50.95 | 41.60 |
| + LN | $24.05_{(+0.36)}$ | $24.00_{(+8.94)}$ | $48.21_{(-2.74)}$ | $47.28_{(+5.68)}$ |
| + Depth | $33.71_{(+10.02)}$ | $21.46_{(+6.40)}$ | $55.12_{(+4.17)}$ | $46.60_{(+5.00)}$ |
| + SE | $20.64_{(-3.05)}$ | $14.29_{(-0.77)}$ | $40.71_{(-10.24)}$ | $39.56_{(-2.04)}$ |
| + Dy | $4.27_{(-19.42)}$ | $6.58_{(-8.48)}$ | $19.76_{(-31.19)}$ | $23.25_{(-18.35)}$ |
| + Dy + SE | $3.09_{(-20.60)}$ | $5.51_{(-9.55)}$ | $13.69_{(-37.26)}$ | $23.55_{(-18.05)}$ |

Figure 6A:
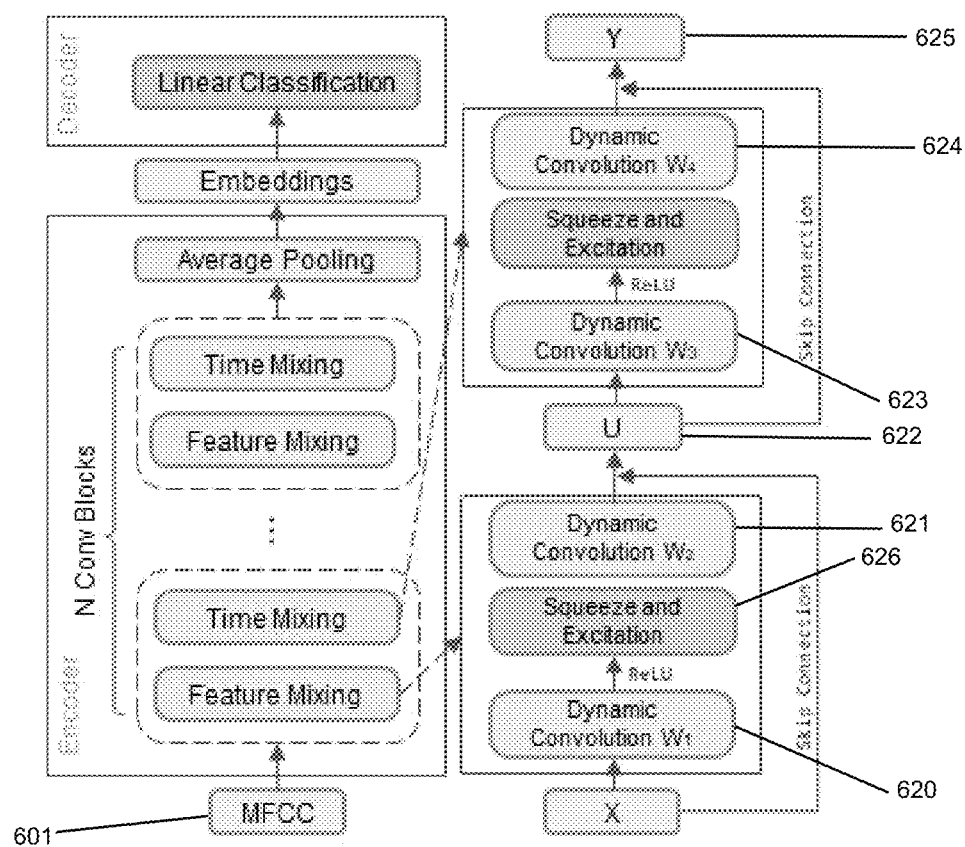
FIG. 6A a diagram showing convolution based encoder/decoder architecture according to an embodiment of the present disclosure.
Figure 6B:
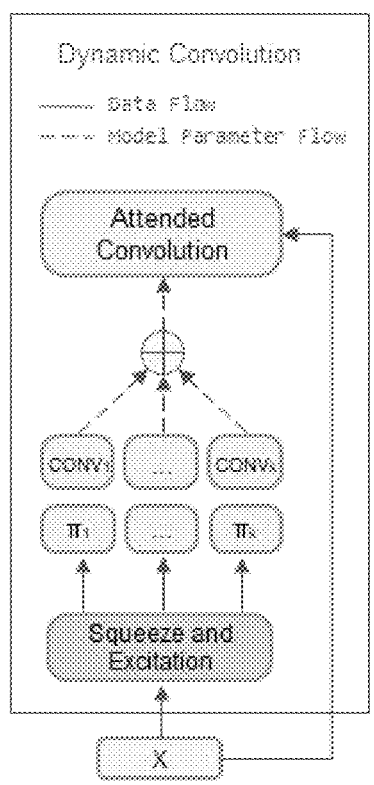
FIG. 6B is a diagram showing a dynamic convolution architecture according to an embodiment of the present disclosure.

On the other hand, adding an SE block improved the performance in all conditions. Among all the components which were added, dynamic convolution (Dy) showed significant performance improvements. Based on observation of the experiments, both Dy and SE components were added together with the ConvMixer to form the Dy-ConvMixer as illustrated in FIG. 6A. Comparisons in later sections are all based on this architecture.

Benchmark Comparison

Three categories of baseline models were selected to compare with DyConvMixer: (1) An RNN-based GRU-ATTN which also reported open vocabulary keyword spotting performance on Hey-Snips; (2) MobileNet and EfficientNet: MobileNetV2 and V3 have been adapted to many audio problems and achieved state-of-the-art results. From the EfficientNet family, B0 and B1 were included as they have relatively small model sizes; and (3) ViT, which gained popularity in vision tasks, and was also adapted to the keyword spotting task. Table 7, below, shows that DyConv-Mixer is significantly smaller compared to the baseline models. In particular, it has less than half the number of parameters in GRU-ATTN and less than half the number of MACs in MobileNetV3.

TABLE 7

| Model | Params | MACs | Model | Params | MACs |
|---|---|---|---|---|---|
| GRU-ATTN [4] | 0.55 | 41.23 | EfficientnetB1 [19] | 6.51 | 58.66 |
| MobileNetV2 [30] | 2.22 | 29.22 | ViT [21] | 0.96 | 77.06 |
| MobileNetV3 [31] | 2.97 | 22.24 | ConvMixer | 0.15 | 10.30 |
| EfficientnetB0 [19] | 4.01 | 39.06 | Ours | 0.19 | 10.97 |

Tables 8 and 9, below, show the False Rejection Rate at 0.3 False Acceptance per hour under "non far-field" and "far-field" conditions respectively. The model according to an embodiment of the present disclosure shows comparable results to MobileNetV3 and EfficientNetB1 under the "non far-field" setting. For the "far-field" setting, DyConvMixer gives much better results on the Hey-Snips dataset, but is outperformed by MobileNetV3 by about 6% on the 10 dB and 6 dB noisy Hey-Snapdragon dataset.

TABLE 8

| | Hey-Snips | | | Snapdragon | | |
|---|---|---|---|---|---|---|
| Model | clean | 10 dB | 6 dB | clean | 10 dB | 6 dB |
| RNN-ATTN [4] | 1.43 | 5.36 | 11.07 | 1.32 | 13.45 | 26.12 |
| MobileNetV2 [30] | 1.07 | 4.64 | 12.50 | 1.61 | 6.25 | 12.47 |
| MobileNetV3 [31] | 0.36 | 5.36 | 16.43 | 0.93 | 4.23 | 10.05 |
| EfficientnetB0 [19] | 0.71 | 5.71 | 7.14 | 2.24 | 7.72 | 14.66 |
| EfficientnetB1 [19] | 0.36 | 3.93 | 10.71 | 1.17 | 5.11 | 11.83 |
| ViT [21] | 6.07 | 11.79 | 17.14 | 7.43 | 23.63 | 35.24 |
| Ours | 0.71 | 2.50 | 6.07 | 0.87 | 4.85 | 10.80 |

TABLE 9

| | Hey-Snips | | | Snapdragon | | |
|---|---|---|---|---|---|---|
| Model | clean | 10 dB | 6 dB | clean | 10 dB | 6 dB |
| RNN-ATTN [4] | 8.57 | 22.50 | 29.29 | 12.68 | 38.75 | 51.79 |
| MobileNetV2 [30] | 15.36 | 27.86 | 37.86 | 20.41 | 33.57 | 41.88 |
| MobileNetV3 [31] | 13.21 | 27.86 | 37.50 | 10.26 | 20.35 | 31.45 |
| EfficientnetB0 [19] | 11.79 | 24.64 | 34.64 | 14.68 | 31.05 | 43.33 |
| EfficientnetB1 [19] | 12.86 | 22.50 | 34.29 | 13.87 | 28.74 | 40.25 |
| ViT [21] | 13.21 | 25.71 | 35.24 | 26.31 | 52.19 | 60.21 |
| Ours | 6.07 | 13.57 | 21.43 | 7.13 | 26.25 | 37.26 |

Ablation Study

In this section, we study the impact of the attention mechanism in dynamic convolution as well as the performance improvements resulting from adding dynamic convolution to the ConvMixer.

Attention Mechanism

To understand the value that the softmax attention mechanism brings to dynamic convolution, we experimented with the original softmax along with 2 other aggregations to the convolutional kernels. The first aggregation is to simply average the kernel weights so the aggregation no longer depends on the input. The second aggregation is by selecting the convolutional kernel with the maximum softmax weight. This will inform us whether the attention mechanism is performing kernel selection.

Table 10, below, shows that softmax aggregation outperforms mean and max aggregation. This indicates that the attention mechanism is able to adapt to its input effectively.

TABLE 10

FRR (%) at 0.3 FA/hour for various aggregation mechanisms

| | Non far-field | | Far-field | |
|---|---|---|---|---|
| Agg | Hey-Snips | Snapdragon | Hey-Snips | Snapdragon |
| Mean | 7.50 | 7.06 | 17.74 | 30.08 |
| Max | $9.41_{(+1.91)}$ | $12.88_{(+5.82)}$ | $27.02_{(+9.28)}$ | $37.70_{(+7.62)}$ |
| Softmax | $3.09_{(-4.41)}$ | $5.51_{(-1.55)}$ | $13.69_{(-4.06)}$ | $23.55_{(-6.89)}$ |

Dropping Dynamic Convolution

According to a network embodiment of the present disclosure, there are two convolution operations per block (excluding the SE layer), and the performance effects of replacing either convolution kernel with a dynamic convolution were observed. Table 11, below, shows that replacing a single convolution layer with dynamic convolution results in a large boost and replacing both convolutions performs best.

TABLE 11

FRR (%) at 0.3 FA/hour for dynamic convolution layers

| | | Non far-field | | Far-field | |
|---|---|---|---|---|---|
| DyC1 | DyC2 | Hey-Stips | Snapdragon | Hey-Stips | Snapdragon |
| No | No | 20.36 | 14.29 | 40.71 | 39.56 |
| Yes | No | $3.81_{(-16.33)}$ | $7.15_{(-7.14)}$ | $15.00_{(-23.71)}$ | $38.58_{(-0.98)}$ |
| No | Yes | $6.31_{(-24.08)}$ | $8.11_{(-6.18)}$ | $15.24_{(-25.47)}$ | $26.10_{(-13.18)}$ |
| Yes | Yes | $3.09_{(-17.27)}$ | $5.51_{(-8.78)}$ | $13.69_{(-27.02)}$ | $23.55_{(-16.01)}$ |

Accordingly, the embodiments disclosed herein include solutions to the open vocabulary keyword spotting problem for edge devices. In particular, disclosed are embodiments of an edge friendly keyword spotting architecture, where various embodiments implement an MLPMixer type model or a CNN architecture inspired by the MLPMixer. As discussed, the disclosed embodiments show marked improvements in performance as compared to existing approaches in the prior art, particularly while being able to keep parameter count and MACs lower for efficiency and resource preservation.

Implementations according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned implementations, and it is intended that not only the appended claims, but also all changes equivalent to claims, should be considered to fall within the scope of the present disclosure.

What is claimed is:

1. A computer-implemented method for open vocabulary keyword spotting by a device, the computer-implemented method comprising:
    receiving enrollment audio from a user comprising a wake word to be enrolled for the device;
    obtaining one or more portions of the enrollment audio each having a duration of 1 second;
    preprocessing the one or more portions of the enrollment audio to obtain a vector representation along at least a feature dimension and a temporal dimension, wherein the dimensions of the vector representation are 81 by 81 along the feature dimension and the temporal dimension, respectively;
    inputting the vector representation to a trained encoding model to generate an embedding representation of the enrollment audio,
    wherein the encoding model comprises a plurality of mixing blocks, and wherein the feature dimension and the temporal dimension of an output of a first layer of each mixing block are flipped for inputting to a second layer of the mixing block;
    storing the embedding representation in a memory for use in detecting input of the enrolled wake word;
    receiving input audio at the device;
    determining whether the input audio comprises the enrolled wake word based on a comparison between one or more embedding representations of the input audio and the stored embedding representation; and
    causing the device to change to a triggered mode for performing in response to a user query based on a determination that the input audio comprises the enrolled wake word.

2. The method of claim 1, wherein the first layer and the second layer of each mixing block are fully connected layers.

3. The method of claim 1, wherein the first layer and the second layer of each mixing block are convolution layers.

4. The method of claim 1,
    wherein determining whether the input audio comprises the enrolled wake word comprises:
    obtaining one or more portions of the input audio based on a preset duration of each portion;
    preprocessing the one or more portions to obtain one or more vector representations of the one or more portions along at least the feature dimension and the temporal dimension; and
    inputting the vector representations of the one or more portions to the encoding model to generate the one or more embedding representations of the input audio.

5. The method of claim 4, wherein the determination is made based on a similarity between the stored embedding representation and the one or more embedding representations of the input audio meeting a preset similarity threshold.

6. The method of claim 4, further comprising padding the stored embedding representation or the one or more embedding representations of the input audio to match lengths for the comparison.

7. The method of claim 4, wherein the comparison comprises determining a cosine distance between the one or more embedding representations of the input audio and the stored embedding representation, and determining a minimum distance which is compared to a threshold for determining whether the input audio comprises the enrolled wake word.

8. A non-transitory memory storing one or more programs, which, when executed by one or more processors of a computing device, cause the computing device to perform:
    receiving enrollment audio from a user comprising a wake word to be enrolled for the device;
    obtaining one or more portions of the enrollment audio each having a duration of 1 second;
    preprocessing the one or more portions of the enrollment audio to obtain a vector representation along at least a feature dimension and a temporal dimension, wherein the dimensions of the vector representation are 81 by 81 along the feature dimension and the temporal dimension, respectively;
    inputting the vector representation to a trained encoding model to generate an embedding representation of the enrollment audio,
    wherein the encoding model comprises a plurality of mixing blocks, and wherein the feature dimension and the temporal dimension of an output of a first layer of each mixing block are flipped for inputting to a second layer of the mixing block;
    storing the embedding representation in a memory for use in detecting input of the enrolled wake word;
    receiving input audio at the device;
    determining whether the input audio comprises the enrolled wake word based on a comparison between one or more embedding representations of the input audio and the stored embedding representation; and
    causing the device to change to a triggered mode for performing in response to a user query based on a determination that the input audio comprises the enrolled wake word.

9. The non-transitory memory of claim 8, wherein the first layer and the second layer of each mixing block are fully connected layers.

10. The non-transitory memory of claim 8, wherein the first layer and the second layer of each mixing block are convolution layers.

11. The non-transitory memory of claim 10, wherein determining whether the input audio comprises the enrolled wake word comprises:
obtaining one or more portions of the input audio based on a preset duration of each portion;
preprocessing the one or more portions to obtain one or more vector representations of the one or more portions along at least the feature dimension and the temporal dimension; and
inputting the one or more vector representations of the one or more portions to the encoding model to generate the one or more embedding representations of the input audio.

12. The non-transitory memory of claim 8, wherein the determination is made based on a similarity between the stored embedding representation and the one or more embedding representations of the input audio meeting a preset similarity threshold.

13. The non-transitory memory of claim 8, wherein the one or more programs further cause the computing device to perform padding the stored embedding representation or the one or more embedding representations of the input audio to match lengths for the comparison.

14. The non-transitory memory of claim 13, wherein the comparison comprises determining a cosine distance between the one or more embedding representations of the input audio and the stored embedding representation, and determining a minimum distance which is compared to a threshold for determining whether the input audio comprises the enrolled wake word.

15. An artificial intelligence (AI) device for open vocabulary keyword spotting, the AI device comprising:
an audio input;
a memory; and
one or more processors configured to:
receive, via the audio input, enrollment audio from a user comprising a wake word to be enrolled for the device;
obtain one or more portions of the enrollment audio each having a duration of 1 second;
preprocess the one or more portions of the enrollment audio to obtain a vector representation along at least a feature dimension and a temporal dimension, wherein the dimensions of the vector representation are 81 by 81 along the feature dimension and the temporal dimension, respectively;
input the vector representation to a trained encoding model to generate an embedding representation of the enrollment audio,
wherein the encoding model comprises a plurality of mixing blocks, and wherein the feature dimension and the temporal dimension of an output of a first layer of each mixing block are flipped for inputting to a second layer of the mixing block;
storing the embedding representation in a memory for use in detecting input of the enrolled wake word;
receive, via the audio input, input audio at the device;
determine whether the input audio comprises the enrolled wake word based on a comparison between one or more embedding representations of the input audio and the stored embedding representation; and
cause the device to change to a triggered mode for performing in response to a user query based on a determination that the input audio comprises the enrolled wake word.

16. The AI device of claim 15, wherein the first layer and the second layer of each mixing block are fully connected layers.

17. The AI device of claim 16, wherein the first layer and the second layer of each mixing block are convolution layers.

18. The AI device of claim 15, wherein determining whether the input audio comprises the enrolled wake word comprises:
obtaining one or more portions of the input audio based on a preset duration of each portion;
preprocessing the one or more portions to obtain one or more vector representations of the one or more portions along at least the feature dimension and the temporal dimension; and
inputting the one or more vector representations of the one or more portions to the encoding model to generate the one or more embedding representations of the input audio.

* * * * *